United States Patent
Sekine

(10) Patent No.: US 8,634,046 B2
(45) Date of Patent: Jan. 21, 2014

(54) OPTICAL ELEMENT HAVING AN ALIGNMENT LAYER FOR AN OPTICAL ANISOTROPIC BODY

(75) Inventor: Keiko Sekine, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 390 days.

(21) Appl. No.: 11/817,703

(22) PCT Filed: Mar. 2, 2006

(86) PCT No.: PCT/JP2006/304014
§ 371 (c)(1),
(2), (4) Date: Sep. 4, 2007

(87) PCT Pub. No.: WO2006/093237
PCT Pub. Date: Sep. 8, 2006

(65) Prior Publication Data
US 2009/0073535 A1    Mar. 19, 2009

(30) Foreign Application Priority Data

Mar. 4, 2005 (JP) .................... 2005-060867
Sep. 30, 2005 (JP) .................... 2005-289292

(51) Int. Cl.
*G02F 1/1333* (2006.01)
*G02F 1/1335* (2006.01)
*G02F 1/1337* (2006.01)

(52) U.S. Cl.
USPC .................... 349/122; 349/117; 349/123

(58) Field of Classification Search
USPC .................... 349/117, 122–123
See application file for complete search history.

(56) References Cited

U.S. PATENT DOCUMENTS

| | | | |
|---|---|---|---|
| 6,081,312 A * | 6/2000 | Aminaka et al. | 349/118 |
| 6,433,853 B1 * | 8/2002 | Kameyama et al. | 349/176 |
| 2004/0075796 A1 * | 4/2004 | Nair et al. | 349/117 |

FOREIGN PATENT DOCUMENTS

| | | |
|---|---|---|
| JP | 08-338913 | 12/1996 |
| JP | 9118717 | 5/1997 |
| JP | 10-506420 | 6/1998 |
| JP | 2002-090532 | 3/2002 |
| JP | 2002-122735 | 4/2002 |
| JP | 2002-533742 | 10/2002 |
| JP | 2003-505561 | 10/2002 |
| JP | 2002-341141 | 11/2002 |
| JP | 2004-139084 | 5/2004 |
| JP | 2004-326128 A | 11/2004 |
| JP | 2004-333702 | 11/2004 |
| JP | 2004-536185 | 12/2004 |

* cited by examiner

*Primary Examiner* — Nathanael R Briggs
(74) *Attorney, Agent, or Firm* — Ladas & Parry LLP

(57) ABSTRACT

An optical element having an alignment layer for an optical anisotropic body, in which the generation of damages in the alignment layer is effectively prevented by providing an optical element having an alignment layer for an optical anisotropic body, wherein a stress releasing layer is formed as an underlying layer for the alignment layer.

9 Claims, 2 Drawing Sheets

OPTICAL ELEMENT HAVING AN ALIGNMENT LAYER FOR AN OPTICAL ANISOTROPIC BODY

TECHNICAL FIELD

The present invention relates to an optical element used in such as a liquid crystal display apparatus, and in particular to an optical element in which an optical anisotropic body or an alignment layer is prevented from being deteriorated or damaged.

BACKGROUND ART

Liquid crystal display apparatuses have been rapidly spreading as alternatives of conventional CRT displays since the apparatuses have characteristics such that they are small in power consumption, light, and thin. As illustrated in FIG. 5, an example of ordinary liquid crystal display apparatuses is a liquid crystal display apparatus having a polarizing plate 102A on the light incident side, a polarizing plate 102B on the light outgoing side, and a liquid crystal cell 104. The polarizing plates 102A and 102B are each a member constructed in such a manner that the member selectively transmits only linearly polarized light (schematically illustrated by each arrow in the figure) having an oscillation face exhibiting a predetermined oscillation direction. The plates 102A and 102B are arranged to face each other in a crossed nicol state that their oscillation directions become a right angle to each other. The liquid crystal cell 104 contains a large number of cells corresponding to pixels, and is arranged between the polarizing plates 102A and 102B.

Liquid crystal display apparatuses have, as a peculiar drawback, a problem about viewing angle properties. The problem about viewing angle properties is a problem that properties such as the contrast or color tone is varied between the cases: where persons watch a liquid crystal display apparatus from the front thereof, and the case where persons watch the liquid crystal display apparatus along a direction oblique thereto. This is because the liquid crystal cell used in the liquid crystal display apparatus exhibits birefringence, and because the apparatus has two polarizing plates arranged in a crossed nicol state.

In order to overcome the viewing angle property-problem, various techniques have been developed up to the present time. A typical method thereof is a method of using a retardation film having a predetermined birefringence. This method of using a retardation film is a method of arranging a retardation film which exhibits a predetermined birefringence between a liquid crystal cell and a polarizing plate, thereby improving the viewing angle properties.

The above-mentioned method of using a retardation film to overcome the viewing angle dependency is useful since the birefringence of the retardation film is varied in accordance with the kind of the liquid crystal cell, thereby making it possible to overcome the viewing angle dependency of liquid crystal display apparatuses in which liquid crystal cells having various optical characteristics are used. Such a retardation film is disclosed in, for example, Patent Documents 1 and 2.

As disclosed in such as Patent Documents 1 and 2, the above-mentioned retardation film is generally a film having a liquid crystal layer where a liquid crystal material is aligned. In order to align a liquid crystal material in a liquid crystal layer, it is necessary to form the liquid crystal layer on an alignment layer having alignment regulating force for the liquid crystal material. Therefore, any retardation film having a liquid crystal layer has an alignment layer as an essential constituent. As such alignment layers, rubbing films which exhibit alignment regulating force by rubbing treatment have widely been used. In recent years, however, attention has been paid to photo alignment layers in which alignment regulating force is expressed by optically aligning treatment (for example, Patent Document 3). Such a photo alignment layer can express alignment regulating force by non-contact optically aligning treatment; therefore, the film has advantages that alien substances are not generated by the aligning treatment and further no restriction is imposed onto the direction in which alignment regulating force is expressed even when a long retardation film is produced.

Incidentally, the above-mentioned retardation film is usually produced by a process of coating an alignment layer and a liquid crystal layer onto a long transparent substrate; therefore, in many cases, the film is in the form that the film is wounded around a winding core in a distribution process. In such a form that the film is wounded, portions of the retardation film are overlapped with each other, thereby applying external stress to the retardation film. Thus, there arises a problem that members such as the alignment layer, the liquid crystal layer is injured or damaged. In particular, in the case of using, as the alignment layer, or the above-mentioned photo alignment layer, the photo alignment layer has a problem of being easily damaged by external stress since the photo alignment layer has a lower mechanical strength than conventional rubbing films or the like, and since the film needs to be made thin.

Patent Document 1: Japanese Patent Application Laid-Open (JP-A) No. 8-338913
Patent Document 2: Japanese Patent Application National Publication No. 2002-533742
Patent Document 3: JP-A No. 2002-90532

DISCLOSURE OF THE INVENTION

Problems to be Solved by the Invention

In light of the above-mentioned problems, the present invention has been made, and a main object thereof is to provide an optical element wherein an alignment layer and others are less damaged.

Means for Solving the Problems

To solve the problems, the present invention provides an optical element, comprising a substrate, and an alignment layer over the substrate, wherein a stress releasing layer is formed as an underlying layer for the alignment layer.

According to the invention, a stress releasing layer is formed as an underlying layer for the alignment layer. Thus, when external stress is applied to the optical element of the invention, the stress releasing layer is deformed so that the external stress can be released. As a result, the alignment layer can be prevented from being damaged. Accordingly, the invention makes it possible to yield an optical element in which its alignment layer is less damaged.

In the present invention, the stress releasing layer preferably has a hardness in the range of universal hardnesses from 200 $N/mm^2$ to 800 $N/mm^2$ when the layer has a thickness of 4 μm.

It is further preferable in the present invention that the stress releasing layer has an elastic modulus in the range of 0.2 to 0.6, in which the elastic modulus is defined as a value of the elastic deformation amount/total deformation amount.

It is also preferable in the present invention that an average cure extent of the stress releasing layer is 60% or more.

When the stress releasing layer has the above-mentioned properties, the alignment layer can be more effectively prevented from being damaged.

In the present invention, the content of a residual solvent remaining in the stress releasing layer is in the range of 1 mg/m² to 250 mg/m². When the content of the residual solvent is in the above-mentioned range, the stress releasing layer can be prevented from being deformed with time, or the hardness, elastic modulus and other properties of the stress releasing layer can be prevented from being changed with time.

In the present invention, the residual solvent is preferably a solvent having permeability into the substrate.

It is further preferable that a material which constitutes the stress releasing layer is a material having permeability into the substrate.

When the residual solvent or the material which constitutes the stress releasing layer is a solvent or material which has permeability into the substrate, the adhesive force between the stress releasing layer and the substrate can be improved in the optical element of the invention.

In the present invention, a thickness of the stress releasing layer is preferably in the range of 0.1 μm to 10 μm. When the thickness of the stress releasing layer is in this range, desired hardness, elastic modulus and other properties are easily given to the stress releasing layer.

In the invention, the stress releasing layer may be integrated with the substrate. When the stress releasing layer and the substrate are integrated with each other, the layer structure of the optical element of the invention can be further decreased. Thus, the optical element of the invention can be made into a thin film, and the production process thereof can be made simple. In this embodiment, the thickness of the stress releasing layer is preferably in the range of 0.5 μm to 100 μm.

In the invention, an optical anisotropic body is preferably formed over the alignment layer. When the optical anisotropic body is formed, desired optical properties can be given to the optical element of the invention.

It is further preferable that the optical anisotropic body includes a polymer made from a liquid crystalline monomer. When the optical anisotropic body contains the polymer, which is made from a liquid crystalline monomer, the optical anisotropic body can be rendered an anisotropic body excellent in optical characteristics expressing performance per unit thickness.

In the invention, the optical element is preferably a retardation film. The retardation film can be preferably used as an optically compensating plate in a liquid crystal display apparatus, or the like.

The invention provides a liquid crystal display apparatus wherein the above-mentioned optical element of the invention is used. The invention makes it possible to yield a liquid crystal display apparatus in which display quality defects resulting from the damage of the alignment layer are less generated.

Effect of the Invention

The optical element according to the invention produces an advantageous effect that its alignment layer and other members can be prevented from being damaged by external stress.

EXPLANATION OF REFERENCE NUMERAL

Figure 1:
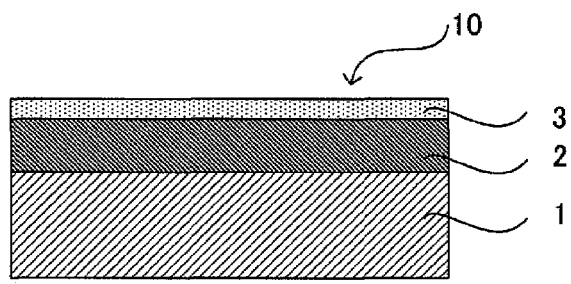
FIG. 1 is a schematic sectional view illustrating an example of the optical element of the invention.

1: substrate
2, and 2': stress releasing layers
3: alignment layer
4: optical anisotropic body
10, 11, and 12: optical elements
20: polarizing plate
30: liquid crystal cell
40: liquid crystal display element

BEST MODE FOR CARRYING OUT THE INVENTION

The optical element and the liquid crystal display apparatus of the invention will be described in detail hereinafter.

A. Optical Element

First, the optical element of the invention is described. The optical element of the invention is an optical element having a substrate, and an alignment layer over the substrate, wherein a stress releasing layer is formed as an underlying layer for the alignment layer. In other words, the optical element of the invention is an element having a substrate, a stress releasing layer formed over the substrate, and an alignment layer formed on the stress releasing layer. The optical element of the invention may have any other layer than the above.

Next, the optical element of the invention is described with reference to the attached drawings. FIG. 1 is a schematic sectional view illustrating an example of the optical element of the invention. As illustrated in FIG. 1, an optical element 10 of the invention has a structure in which over a substrate 1, a stress releasing layer 2 and an alignment layer 3 are laminated in this order.

Figure 2:
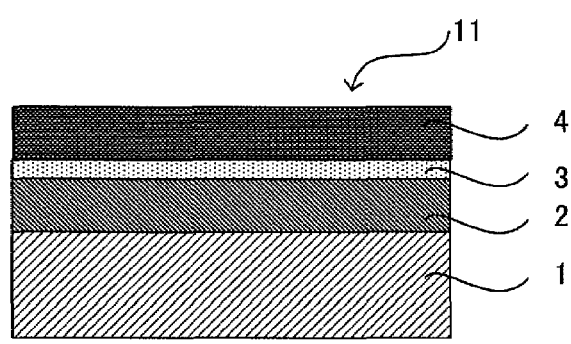
FIG. 2 is a schematic sectional view illustrating another example of the optical element of the invention.

FIG. 2 is a schematic sectional view illustrating another example of the optical element of the invention. As illustrated in FIG. 2, an optical element 11 of the invention is an element having a structure in which over a substrate 1, a stress releasing layer 2, an alignment layer 3, and an optical anisotropic body 4 are laminated in this order.

Figure 3:
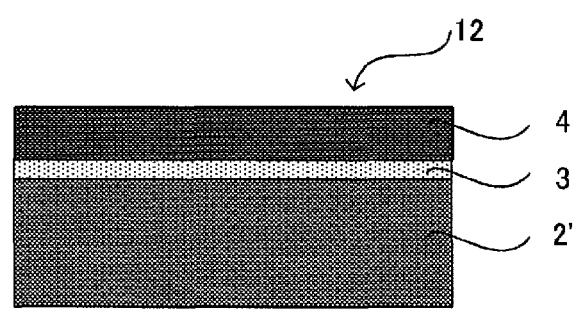
FIG. 3 is a schematic sectional view illustrating yet another example of the optical element of the invention.

The optical element of the invention may have a structure in which the stress releasing layer and the substrate are integrated with each other. Such a structure is described with the reference to one of the drawings. FIG. 3 is a schematic sectional view illustrating an example of the structure formed by integrating the stress releasing layer with the substrate. As illustrated in FIG. 3, an optical element 12 of the invention may have a structure in which over a layer 2' formed by integrating a stress releasing layer with a substrate, an alignment layer 3 and an optical anisotropic body 4 are formed in this order. When the optical element has such a structure, the layer 2', which is formed by integrating the stress releasing layer with the substrate, has both of a function as a substrate, and a function as a stress releasing layer.

According to the invention, the stress releasing layer is formed as the underlying layer for the alignment layer, and thus when external stress is applied to the optical element of the invention, the stress releasing layer is deformed so that the external stress can be released. Thus, the alignment layer can be prevented from being damaged. Accordingly, the invention makes it possible to yield an optical element wherein its alignment layer is less damaged.

The optical element of the invention is an optical element having a substrate, a stress releasing layer, and an alignment layer. The optical element of the invention preferably has an optical anisotropic body. Each of the structures of the optical element of the invention will be described in detail hereinafter.

1. Stress Releasing Layer

First, the stress releasing layer in the invention is described. The stress releasing layer in the invention is a layer formed as an underlying layer for an alignment layer, which will be described later, and is usually formed between the substrate and the alignment layer which constitute the optical element of the invention. The stress releasing layer in the invention has a function that when external stress is applied to the optical element of the invention, the layer deforms to prevent the alignment layer and others from being damaged by the external stress.

As described above, the stress releasing layer in the invention has a function of releasing external stress by the deformation thereof; the "deformation easiness" of this stress releasing layer depends on various properties that the stress releasing layer has. Typical examples of the properties contributing to the "deformation easiness" include the hardness, the elastic modulus and the average cure extent of the stress releasing layer.

The hardness, the elastic modulus and the average cure extent of the stress releasing layer in the invention are not particularly limited as long as they are in the range in which desired "deformation easiness" can be given to the stress releasing layer in accordance with the usage and the production process of the optical element of the invention, and others.

In particular, in the invention, the universal hardness of the stress releasing layer is preferably in the range of 200 N/mm$^2$ to 800 N/mm$^2$, more preferably in the range of 300 N/mm$^2$ to 700 N/mm$^2$, even more preferably from 400 N/mm$^2$ to 600 N/mm$^2$ when the layer has a thickness of 4 μm. The universal hardness is a value obtained by pushing a Vickers pyramidal indenter into the stress releasing layer at a test load F (of 0.4 mN to 1 N), measuring the pushed-in depth displacement of the Vickers pyramidal indenter, and then calculating the universal hardness value (HU) of the stress releasing layer from the following expression: $HU=F/(26.3 \times h2)$. The universal hardness value (HU) can be obtained from the test load F and the pushed-in surface area of the indenter, and the surface area can be obtained from the pushed-in depth (h).

The elastic modulus of the stress releasing layer is preferably in the range of 0.2 to 0.6, in particular preferably in the range of 0.3 to 0.5, the elastic modulus being defined as the value of the elastic deformation amount/the total deformation amount. If the elastic modulus is below the range, the layer is not easily formed into a film form. Moreover, the layer becomes sticky, and the layer may adhere onto such as a roll of a coater when the optical element is produced. If the elastic modulus is over the range, the stress releasing layer becomes hard. Thus, for example, when the formation of the alignment layer is completed, the resultant is wounded into a roll form and the alignment layer is damaged. The elastic modulus defined as the value of the elastic deformation amount/the total deformation amount can be calculated out from, for example, the elastic deformation amount and the plastic deformation amount obtained when the above-mentioned universal hardness is measured.

The method for setting the elastic modulus (the elastic deformation amount/the total deformation amount) of the stress releasing layer into the above-mentioned range may be a method of adjusting the molecular weight of the material used for the stress releasing layer. When the average molecular weight of the material is, for example, high, the elastic modulus of the stress releasing layer also tends to become high. Conversely, when the average molecular weight of the material is low, the elastic modulus of the stress releasing layer tends to become low. In light of such a tendency, the average molecular weight thereof is adjusted or selected in accordance with the kind of the adopted material, so as to adjust the elastic modulus into a predetermined value.

When an active energy ray curing resin, which will be described later, is used as the material of the stress releasing layer, the elastic modulus of the stress releasing layer can be adjusted into the above-mentioned range by changing conditions for the radiation of the active energy ray. For example, when the active energy ray is radiated at a high illuminance for a short time, the stress releasing layer becomes hard so that the elastic modulus tends to become high. Conversely, when the active energy ray is radiated at a low illuminance for a long time, the stress releasing layer becomes soft so that the elastic modulus tends to become low. Accordingly, the elastic modulus can be set into a predetermined value by appropriately changing the conditions for the active energy ray radiation.

Furthermore, in the invention, the average cure extent of the stress releasing layer is preferably 60% or more, in particular preferably in the range of 80% to 90%. The average cure extent in the range makes the following possible for example: even when the form of the optical element of the invention is made into a roll-wounded form, it is possible to restrain blocking generated by close adhesion between portions of the optical element which overlap with each other. The average cure extent is the average of the cure extent of the vicinity of the substrate and that of the vicinity of the alignment layer.

The average cure extent of the stress releasing layer can be obtained by observing the amount of reactive groups remaining in the stress releasing layer. In order to observe the in-layer distribution of the average cure extent of the stress releasing layer, it is necessary to create a cross section of the stress releasing layer. Thus, in a specific method for measuring the average cure extent, the stress releasing layer is first cut in an obliquely-cutting way. In the case where the stress releasing layer is obliquely cut in this way, the resultant cross section, which is different from ordinary cross section, has a larger apparent thickness; therefore, at the time of observing the remaining amount of the reactive groups later, the spatial resolution can be made high. Next, the remaining amount of the reactive groups is observed after the cross section of the stress releasing layer is obtained as described above. Typical examples of the method for observing the remaining amount of the reactive groups include a method of observing molecular oscillation originating from the reactive groups through absorption of infrared rays, and a method of measuring the masses assigned to the structures of the reactive groups. More specific examples thereof include: (1) a method of using a reflection measuring method with a microscopic infrared spectrophotometer to measure the intensity distribution of the stretching oscillation of the carbon double bonds (C=C) assigned to the reactive groups; (2) a method of using time-flight type secondary ion mass spectroscopy to map the mass numbers based on the reactive groups; and (3) a method of using an X-ray photoelectron spectrometer to measure the signal intensity based on the reactive groups in all the carbon atoms.

In the invention, the average cure extent is represented by use of the unit of %. In the case of measuring the average cure extent in the methods (1), (2) and (3), reference points of % are as follows: the stress releasing layer is formed by coating/drying a composition for forming the stress releasing layer onto a substrate to form a coated film, and then exposing the coated film to ultraviolet rays, visible rays or the like; about the coated film which is at a stage before the exposure, the measurements (1), (2) and (3) are made and the signal intensities of respective values measured at these times are each converted to 0%; and states that the signal intensities in the (1), (2) and (3) are each zero (states that the reactive groups are not present in the stress releasing layer) are each converted to 100%.

The coated film can be formed by, for example, a method described in the item "6. Process for producing an optical element", which will be described later.

Any solvent may remain in the stress releasing layer in the invention. When a solvent remains in the stress releasing layer, the solvent is usually a solvent used when the stress releasing layer is formed. In this case, the content of the residual solvent in the stress releasing layer may be appropriately decided in accordance with the usage of the optical element of the invention, and so on as long as the hardness, the elastic modulus and other properties of the stress releasing layer are not damaged. Usually, as the amount of the residual solvent is smaller, more preferable results are obtained. Specifically, the residual solvent amount is preferably in the range of 1 mg/m$^2$ to 250 mg/m$^2$, more preferably 250 mg/m$^2$ or less. When the residual solvent amount is in the range, it is possible to prevent the stress releasing layer form deforming with time or prevent the above-mentioned "deformation easiness" of the stress releasing layer from changing with time. If the residual solvent amount is over the range, blocking may easily be generated.

The residual solvent amount in the invention can be obtained, for example, by creating 22 stripes each having a size of about 0.9 cm×5 cm from the stress releasing layer cut into a piece 10 cm square, putting these into a 30 ml vial container to create a measuring sample, using a gas chromatograph (tradename: "GC-9A", manufactured by Shimadzu Corporation) to trap the measuring sample thermally at 150° C. for 10 minutes, obtaining the total amount of the solvent, and then converting the total amount to the weight thereof per m$^2$.

When the stress releasing layer in the invention contains a residual solvent, the residual solvent is preferably a solvent having permeability into a substrate, which will be described later. When the residual solvent has permeability into the substrate, to be described later, the adhesive force between the stress releasing layer and the substrate can be improved in the optical element of the invention.

The matter that the residual solvent has permeability into the substrate can be evaluated by specifying the solvent species of the residual solvent contained in the stress releasing layer and then using a solvent having the same solvent species to make the following permeability test: a piece, having a size of 1 cm×2 cm, cut from the substrate is immersed into a sample tube filled with 10 mL of the solvent to make an evaluation. After the substrate is allowed to stand still for 5 minutes, the substrate which deforms, turns into white turbidity, or is dissolved can be evaluated as a solvent having permeability into the substrate.

In the case where the substrate, which will be described later, is, for example, triacetylcellulose (TAC), the residual solvent species having the permeability may be methyl ethyl ketone, ethyl acetate or the like. In the case where the substrate is a cyclic olefin, the solvent may be toluene or cyclohexane.

The material constituting the stress releasing layer used in the invention is not particularly limited as long as the material can give desired hardness, elastic modulus and other properties to the stress releasing layer, and the material may be any resin material. It is particularly preferred to use a resin material having permeability into the substrate, which will be described later. The use of such a resin material makes it possible to improve the adhesive force between the stress releasing layer and the substrate in the optical element of the invention.

The matter that the resin material used in the invention has permeability into the substrate, to be described later, can be checked, after the resin material constituting the stress releasing layer is specified, by making the following permeability test using the same resin material. That is, a piece, having a size of 1 cm×2 cm, cut from the substrate is immersed into a sample tube filled with 10 mL of the resin material to make an evaluation. After the substrate is allowed to stand still for 5 minutes, the resin material which causes the substrate to deform, turn into white turbidity, or be dissolved can be evaluated as a resin material having permeability into the substrate. In the case where the resin material to be evaluated is solid at normal temperature, the resin material can be evaluated by melting the resin material and then performing the same method as described above.

In the invention, it is preferred to use, as the resin material, an active energy ray curing resin which can be three-dimensionally crosslinked by an active energy ray. By use of such a resin, desired hardness, elastic modulus, and other properties can easily be given to the stress releasing layer.

Examples of the active energy ray curing resin include an ultraviolet ray curing resin which can be three-dimensionally crosslinked by ultraviolet rays, and an electron beam curing resin which can be three-dimensionally crosslinked by an electron beam. In the invention, it is preferred to use the ultraviolet ray curing resin.

The ultraviolet ray curing resin is preferably a resin about which the ultraviolet ray wavelength for generating the three-dimensional crosslink is in the range of 100 nm to 450 nm. The resin is more preferably a resin about which the wavelength is in the range of 250 nm to 400 nm. The ultraviolet ray having a wavelength in this range can easily be obtained from an ordinary light source.

Specific examples of the ultraviolet ray curing resin used in the invention include monofunctional monomers and polyfunctional monomers, such as reactive ethyl(meth)acrylate, ethylhexyl(meth)acrylate, styrene, methylstyrene and N-vinylpyrrolidone; polymethylolpropane tri(meth)acrylate, hexanediol(meth)acrylate, triethylene(polypropylene)glycol (meth)diacrylate, tripropyleneglycol di(meth)acrylate, diethylene glycol di(meth)acrylate, 1,6-hexanediol di(meth)acrylate, neopentylglycol di(meth)acrylate, isocyanuric acid EO modified diacrylate, pentaerythritol tri(meth)acrylate, dipentaerythritol hexa(meth)acrylate, bisphenolfluorene derivatives, bisphenoxyethanolfluorene diacrylate, bisphenolfluorene diepoxy acrylate, urethane acrylate, caprolactone modified urethane acrylate, and caprolactone modified acrylate.

In the invention, these ultraviolet ray curing resins may be used alone or may be used in the form of a mixture of two or more thereof.

In the invention, it is in particular preferred to use, as the ultraviolet ray curing resin, triethylene (polypropylene) glycol diacrylate, 1,6-hexanediol di(meth)acrylate, isocyanuric acid EO modified diacrylate, bisphenolfluorenone derivatives, urethane acrylate, caprolactone modified urethane acrylate, or caprolactone modified acrylate. Of these, urethane acrylate, in particular, caprolactone modified urethane acrylate is preferably used since the above-mentioned elastic modulus of the stress releasing layer can be realized.

In the case of using, as the constituting material of the stress releasing layer, the ultraviolet ray curing resin, the stress releasing layer preferably contains a photopolymerization initiator and a photosensitizer. Examples of the photopolymerization initiator include acetophenones, benzophenones, Michler benzoyl benzoate, α-amyloxime esters, tetramethylthiuram monosulfide, and thioxanthones. Examples of the photosensitizer include n-butylamine, triethylamine, and poly-n-butylphosphine.

It is allowable to use, as the stress releasing layer used in the invention, an aligned polymerized liquid crystal layer or a liquid crystal layer polymerized in an isotropic phase.

The stress releasing layer used in the invention may have a mono-layered structure or a structure in which plural layers are laminated. The structure with plural layers laminated may be a structure in which layers having the same composition are laminated, or a structure in which layers having different compositions are laminated.

The stress releasing layer in the invention may be integrated with the substrate, which will be described later. When the stress releasing layer is integrated with the substrate, the layer structure of the optical element of the invention can be further decreased. For this reason, for example, the optical element of the invention can be made into the form of a thinner film, and the production process thereof can be made simpler.

The matter that the stress releasing layer in the invention "is integrated with" the substrate, which will be described later, does not mean any embodiment in which the stress releasing layer and the substrate are laminated onto each other, but means any embodiment in which a single layer is formed which has both of a function of the stress releasing layer and a function of the substrate.

Usually, the thickness of the stress releasing layer used in the invention is preferably in the range of 0.1 μm to 10 μm, in particular preferably in the range of 1 μm to 8 μm. If the thickness of the stress releasing layer is below the range, the above-mentioned stress releasing function may not be sufficient. If the thickness is over the range, the whole of the retardation film becomes thick and further disadvantages in costs may be produced.

On the other hand, when the stress releasing layer and the substrate are integrated with each other as described above, the thickness of the layer is preferably in the range of 0.5 μm to 100 μm, in particular preferably in the range of 5 μm to 100 μm.

2. Alignment Layer

Next, the alignment layer used in the invention is described. The alignment layer in the invention is a film having the following force when an optical anisotropic body that contains a liquid crystalline monomer is formed on the film: alignment regulating force for arranging the liquid crystalline monomer into a predetermined form.

The species of the alignment layer in the invention is not particularly limited as long as the species can express the above-mentioned alignment regulating force. Usually, there is used a rubbing film which is made of such as polyimide, polyamide or polyvinyl alcohol and which expresses the alignment regulating force by rubbing treatment, or a photo alignment layer which is made of a photo alignment material capable of expressing the alignment regulating force by irradiation with polarized light and which expresses the alignment regulating force in a photo aligning method. In the invention, either of the rubbing film and the photo alignment layer can be suitably used. The use of the photo alignment layer is preferred. The photo alignment layer has advantages that no alien substance is generated in accompaniment with aligning treatment since the film can express alignment regulating force by non-contact aligning treatment and further no limitation is imposed onto the direction in which alignment regulating force is expressed even when a long optical element is produced. In other words, when the rubbing film is used, it is difficult to express alignment regulating force for aligning a liquid crystalline monomer in a direction other than the direction parallel to the longitudinal direction of the roll; however, the photo alignment layer makes this expression possible.

When the photo alignment layer is used as the above-mentioned alignment layer, the photo alignment material which constitutes the photo alignment layer is not particularly limited as long as the material is a material which can express alignment regulating force by irradiation with polarized light having a desired wavelength. The photo alignment material used in the invention can be roughly classified into a photo isomerizing material, only the molecular shape of which is changed by irradiation with polarized light to change alignment regulating force reversibly, and a photo reactive material, the molecule itself of which is changed by irradiation with polarized light. In the invention, either of the photo isomerizing material and the photo reactive material can be preferably used. The use of the photo reactive material is more preferred. As described above, the photo reactive material is a material the molecule of which reacts by irradiation with polarized light, so as to express alignment regulating force; thus, the alignment regulating force can be irreversibly expressed. Accordingly, the photo reactive material is better than the photo isomerizing material in stability of alignment regulating force over time.

The photo reactive material can be further classified in accordance with the kind of reaction generation by irradiation with polarized light. Specifically, the material can be classified into: a photo dimerizing material, which expresses alignment regulating force by the generation of photo dimerization reaction; a photo decomposable material, which expresses alignment regulating force by the generation of photo decomposition reaction; a photobinding material, which expresses alignment regulating force by the generation of photobinding reaction; a photo decomposable and photobinding material, which expresses alignment regulating force by the generation of photodecomposition reaction and photobinding reaction; and others. In the invention, anyone of the photo reactive materials can be preferably used. The use of the photo dimerizing material is more preferred.

The photo dimerizing material used in the invention is not particularly limited as long as the material is a material which can express alignment regulating force by the generation of photo dimerization reaction. In the invention, it is particularly preferred that the wavelength of light for generating photo dimerization reaction is in the range of 200 nm to 300 nm.

Examples of such a photo dimerizing material include polymers each having cinnamate, coumalin, benzilidenephthalimidine, benzilideneacetophenone, diphenylacetylene, stilbazole, uracil, quinolinone, maleinimide, or a cinnamilidene acetic acid derivative. In the invention, it is particularly preferred to use a polymer having at least one of cinnamate and coumalin, or a polymer having cinnamate and coumalin. Specific examples of such a photo dimerizing materials include polyvinyl cinnamate, and compounds described in JP-A No. 9-118717, Japanese Patent Application National Publication Nos. 10-506420 and 2003-505561.

The cinnamate and coumalin which are preferably used in the invention are ones represented by the following formulae Ia and Ib.

[Chemical formula 1]

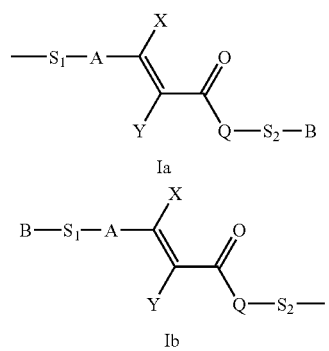

In the formulae, A represents pyrimidine-2,5-diyl, pyridine-2,5-diyl, 2,5-thiophenylene, 2,5-franylene, 1,4- or 2,6-naphthylene, or phenylene which is unsubstituted or mono- or poly-substituted with fluorine, chlorine, or a cyclic, linear or branched alkyl residual group having 1 to 18 carbon atoms (the group being a group unsubstituted or mono- or poly-substituted with fluorine or chlorine in which one or more $CH_2$ groups which are not adjacent to each other may be independently substituted with the group(s) C).

In the formulae, B represents a hydrogen atom, or represents a group which can react or interact with a second material such as a polymer, an oligomer, a monomer, an optically active polymer, an optically active oligomer and/or an optically active monomer, or a surface.

In the formulae, C represents a group selected from —O—, —CO—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O— and —Si(CH$_3$)$_2$—O—Si(CH$_3$)$_2$—, in which R$^1$ represents a hydrogen atom or a lower alkyl.

In the formulae, D represents a group selected from —O—, —CO—, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH═CH—, —C≡C—, —O—CO—O— and —Si(CH$_3$)$_2$—O—Si(CH$_3$)$_2$—, in which R$^1$ represents a hydrogen atom or a lower alkyl, an aromatic group, or an alicyclic group.

In the formulae, S$^1$ and S$^2$ each independently represent a single bond, or spacer unit, for example, a linear or branched alkylene group having 1 to 40 carbon atoms (the group being a group unsubstituted or mono- or poly-substituted with fluorine or chlorine in which one or more CH$_2$ groups which are not adjacent to each other may be independently substituted with the group(s) D but oxygen atoms are not bonded directly to each other).

In the formulae, Q represents an oxygen atom, or —NR$^1$— in which R$^1$ represents a hydrogen atom or a lower alkyl.

In the formulae, X and Y each independently represent hydrogen, fluorine, chlorine, cyano, an alkyl having 1 to 12 carbon atoms (the alkyl being an alkyl that may be substituted with fluorine in which one or more alkyl CH$_2$ groups which are not adjacent to each other may be substituted with —O—, —CO—O—, —O—CO— and/or —CH═CH—).

In the invention, it is preferred to use cinnamates and coumalins described in Japanese Patent Application National Publication No. 2004-536185 out of those represented by the above-mentioned formulae.

The alignment layer in the invention preferably contains a monomer or oligomer having one or more functional groups. When the monomer or oligomer is contained, the alignment layer in the invention can be rendered a film excellent in adhesion properties to any other layer adjacent to the alignment layer.

As the monomer or oligomer used in the invention, the following can be used alone or in a mixture form: monofunctional monomers each having an acrylate functional group (such as reactive ethyl(meth)acrylate, ethylhexyl(meth)acrylate, styrene, methylstyrene, and N-vinylpyrrolidone); polyfunctional monomers (such as polymethylolpropane tri(meth)acrylate, hexanediol (meth)acrylate, triethylene (polypropylene)glycol diacrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate, isocyanuric acid poly(meth)acrylate (such as isocyanuric acid EO diacrylate)); and bisphenolfluorene derivatives (such as bisphenoxyethanolfluorene diacrylate and bisphenolfluorene diepoxyacrylate); and others.

The monomer or oligomer used in the invention is preferably one having a polymerizable functional group. In the case where the optical element of the invention has an optical anisotropic body containing a polymer made from a liquid crystalline monomer, it is preferred that the above-mentioned monomer or oligomer contains the same species of the liquid crystalline monomer which constitutes the polymer made from the liquid crystalline monomer contained in the optical anisotropic body.

Furthermore, in the case of using a method of making the alignment layer into a roll-wounded form when the alignment layer is laminated on a substrate as the method for producing the optical element of the invention, it is preferred to use, as the above-mentioned monomer or oligomer, a monomer or oligomer which makes the alignment layer solid at normal temperature (20 to 25° C.). In this case, the species of the monomer or oligomer is preferably a monomer or oligomer solid at normal temperature (20 to 25° C.). This way makes it possible that even if the alignment layer is made into a roll-wounded form when the alignment layer is laminated on a substrate, the generation of blocking, which is caused by a matter that the alignment layer adheres onto the rear face of the substrate, is prevented.

In the case where the alignment layer in the invention contains the above-mentioned monomer or oligomer, the content thereof is preferably in the range of 0.01 to 3 times, in particular preferably 0.05 to 1.5 times the mass of the above-mentioned photo reactive material. If the content is below the range, for example, at the time of forming an optical anisotropic body onto the alignment layer, the optical anisotropic body and the alignment layer may not be caused to adhere closely to each other with a desired strength. If the content is over the range, the alignment regulating force of the alignment layer may lower.

The thickness of the alignment layer in the invention is preferably from 0.01 µm to 0.5 µm, in particular preferably from 0.02 µm to 0.1 µm.

3. Substrate

Next, the substrate used in the invention is described. The substrate used in the invention is a member for supporting the stress releasing layer, the alignment layer, and others.

The substrate used in the invention may be made of a flexible material, which has flexibility, or a rigid material, which has no flexibility. In the invention, the flexible material is preferably used. The use of the flexible material makes it possible to render the production process of the optical element of the invention a roll-to-roll process. As a result, the obtained optical element is an optical element excellent in productivity.

Examples of the material which constitutes the flexible material include cellulose derivatives, norbornene based polymers, cycloolefin based polymers, polymethyl methacrylate, polyvinyl alcohol, polyimide, polyarylate, polyethylene terephthalate, polysulfone, polyethersulfone, amorphous polyolefin, modified acrylic polymers, polystyrene, epoxy resin, polycarbonate, and polyester. In particular, the use of cellulose derivatives is preferred in the invention. Since cellulose derivatives are excellent in optical isotropy, an optical element excellent in optical properties can be obtained.

In the invention, it is preferred to use cellulose esters out of the above-mentioned cellulose derivatives, and further it is preferred to use cellulose acylates out of the cellulose esters. The cellulose acylates are advantageous in availability since they are industrially widely used.

The cellulose acylates are preferably low aliphatic acid esters having 2 to 4 carbon atoms. The lower aliphatic acid esters may each be an ester containing only a single lower aliphatic acid ester, such as cellulose acetate, or an ester containing plural lower aliphatic acid esters, such as cellulose acetate butyrate, or cellulose acetate propionate.

In the invention, it is particularly preferred to use cellulose acetate out of the lower aliphatic acid esters. It is most preferred to use, as the cellulose acetate, triacetyl cellulose having an average acetification degree of 57.5 to 62.5% (substitution degree: 2.6 to 3.0). The acetification degree means the amount of bonded acetic acid per unit mass of a cellulose. The acetification degree can be obtained by measurement and calculation of the acetylation degree in ASTM: D-817-91 (Test Method for Cellulose Acetate etc). The acetification degree of triacetylcellulose which constitutes any triacetylcellulose film can be obtained by removing impurities contained in the film, such as a plasticizer, and then performing the above-mentioned method.

The substrate used in the invention may contain therein additives such as an ultraviolet absorber, a plasticizer, lubricant and an antioxidant.

The transparency of the substrate used in the invention may be decided at will in accordance with the transparency desired for the optical element of the invention, and other factors. Usually, the transmittance in the range of visible rays is preferably 80% or more, more preferably 90% or more. If the transmittance is low, the haze of the optical element of the invention may become larger than a desired value.

The transmittance of the substrate can be measured by JIS K7361-1 (a testing method of the overall light transmittance of plastic-transparent material).

The thickness of the substrate used in the invention is not particularly limited as long as the thickness causes the substrate to have necessary self-supporting properties in accordance with the usage of the optical element of the invention, and others. Usually, the thickness is preferably in the range of 25 µm to 100 µm, in particular preferably in the range of 30 µm to 100 µm. If the thickness of the substrate is below the range, the self-supporting properties necessary for the optical element of the invention may not be obtained. If the thickness is over the range, for example, at the time of cutting and working the optical element of the invention work waste may increase and the blade for the cutting may rapidly wear down.

The structure of the substrate in the invention is not limited to a mono-layered structure, and thus the material may have a structure in which plural layers are laminated. In the case where the substrate has a structure with plural layers laminated, the layers may be laminated layers having the same composition, or laminated layers having different compositions.

The substrate in the invention may be integrated with the above-mentioned stress releasing layer. The integration of the substrate with the stress releasing layer makes it possible to further decrease the number of members for the layer structure of the optical element of the invention; therefore, for example, the optical element of the invention can be made into a thin film form and further the production process can be made simple.

The form of the substrate may be the form of a sheet having a predetermined size, or the form of a long film having a predetermined length.

4. Optical Anisotropic Body

In the optical element of the invention, it is preferred that an optical anisotropic body is formed on the alignment layer. The formation of the optical anisotropic body makes it possible to give desired optical properties to the optical element of the invention. The optical anisotropic body used in the invention will be described hereinafter.

The optical anisotropic body used in the invention is not particularly limited as long as the body gives desired optical characteristics to the optical element of the invention. The optical anisotropic body is preferably one containing a polymer made from a liquid crystalline monomer. When the optical anisotropic body contains a polymer made from a liquid crystalline monomer, the optical anisotropic body can have excellent optical characteristics expressing properties per unit thickness of the optical anisotropic body.

The liquid crystalline monomer is not particularly limited as long as the monomer is a liquid crystalline monomer having a polymerizable functional group. The liquid crystalline monomer can be appropriately selected for use in accordance with optical properties desired for the optical element of the invention, and other factors.

As the polymerizable functional group, there can be used various polymerizable functional groups which can be polymerized by action of an ionizing radiation ray, such as ultraviolet ray or electron beam, or heat. Typical examples of these polymerizable functional groups include radical polymerizable functional groups, and cationic polymerizable functional groups. Typical examples of the radical polymerizable functional groups include functional groups each having at least one ethylenically unsaturated double bond, which can undergo addition polymerization. Specific examples thereof include a substituted or unsubstituted vinyl group; and substituted or unsubstituted acrylate groups, which are generic terms of such as an acryloyl group, a methacryloyl group, and an acryloyloxy group, a methacryloyloxy group. Specific examples of the cationic polymerizable groups include epoxy groups. Other examples of the polymerizable functional groups include isocyanate groups and an unsaturated triplet bond. Of these groups, the functional group having an ethylenically unsaturated double bond is preferably used from the viewpoint of the process.

The liquid crystalline monomer used in the invention may have plural polymerizable functional groups as described above, or only one out of the groups. A liquid crystalline monomer having plural polymerizable functional groups and a liquid crystalline monomer having only one polymerizable functional group may be used in a mixture form.

Specific examples of the liquid crystalline monomer used in the invention include compounds described in JP-A No. 7-258638, Japanese Patent Application National Publication No. 10-508882, and JP-A No. 2003-287623. In the invention, it is particularly preferred to use, as the liquid crystalline monomer, compounds represented by the following chemical formulae (1) to (16):

[Chemical formula 2]

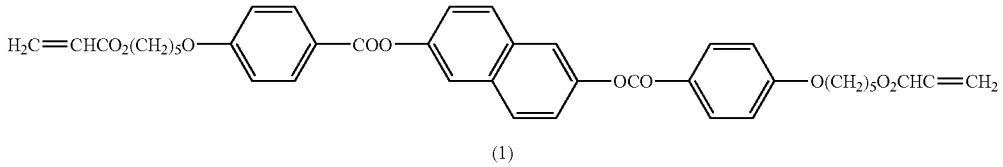
(1)

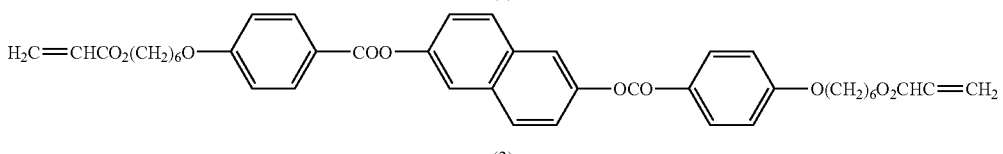
(2)

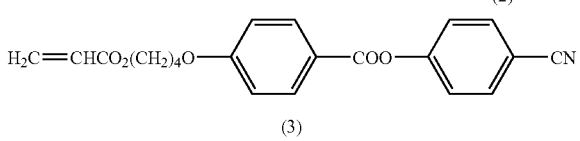
(3)

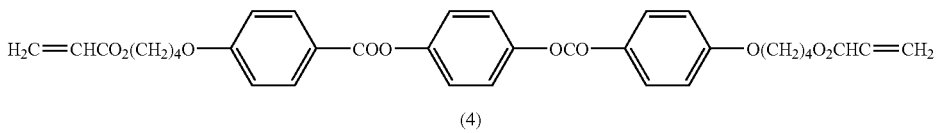
(4)

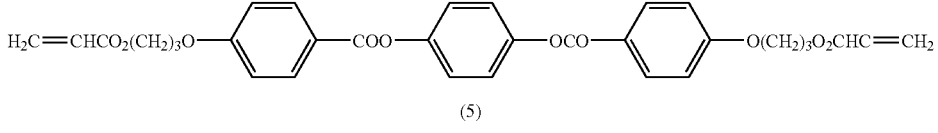
(5)

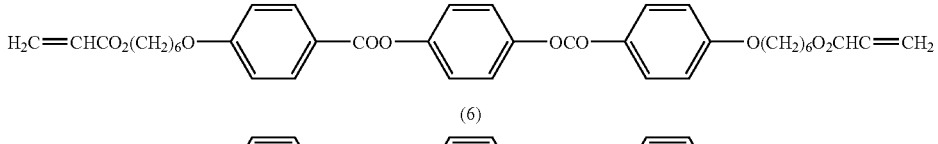
(6)

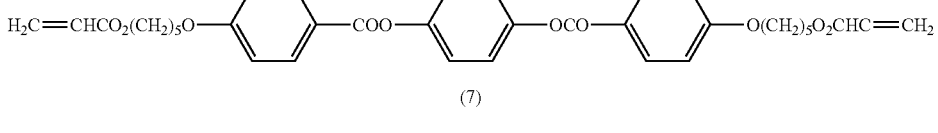
(7)

[Chemical formula 3]

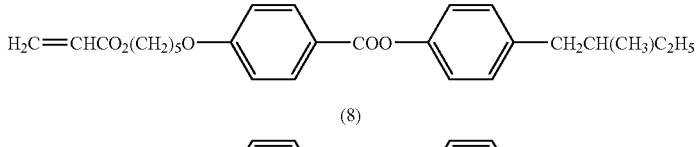
(8)

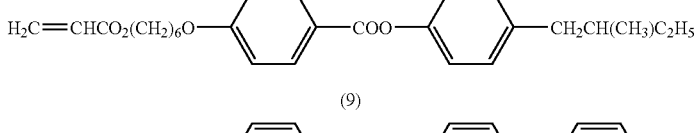
(9)

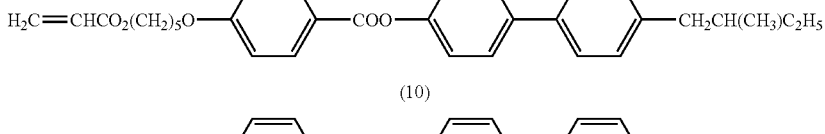
(10)

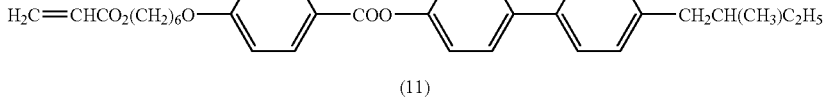
(11)

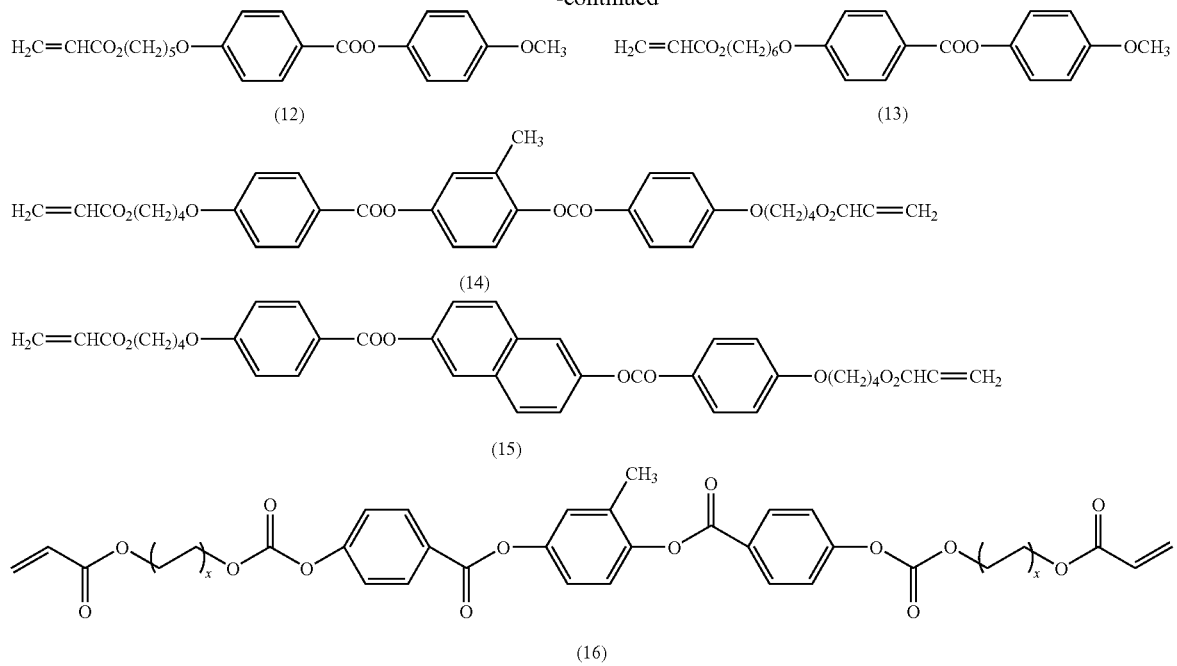

(12), (13), (14), (15), (16)

X: an integer from 2 to 5

About the liquid crystalline monomer used in the invention, a single species thereof may be used, or two or more species thereof may be used in a mixture form. In the case of using two or more species of the liquid crystalline monomer in a mixture form in the invention, it is allowable to mix it with a liquid crystalline monomer having no polymerizable functional group and use the mixture.

The optical anisotropic body in the invention may contain a compound other than the above-mentioned polymer that is made from a liquid crystalline monomer. The other compound is not particularly limited as long as the compound neither damages the alignment state of the liquid crystalline monomer in the optical anisotropic body nor the optical characteristic expressing properties of the optical anisotropic body. The other compound can be appropriately selected for use in accordance with the usage of the optical element of the invention, and other factors.

Examples of the other compound used in the invention include a chiral agent, a polymerization initiator, a polymerization inhibitor, a plasticizer, a surfactant, and a silane coupling agent.

The polymerization initiator or polymerization inhibitor is in particular preferably used as the other compound in the invention.

Examples of the polymerization initiator include benzophenone, methyl o-benzylbenzoate, 4,4-bis(dimethylamine)benzophenone, 4,4-bis(diethylamine)benzophenone, α-amino/acetophenone, 4,4-dichlorobenzophenone, 4-benzoyl-4-methyldiphenylketone, dibenzyl ketone, fluorenone, 2,2-diethoxyacetophenone, 2,2-dimethoxy-2-phenylacetophenone, 2-hydroxy-2-methylpropiophenone, p-tert-butyldichloroacetophenone, thioxanthone, 2-methylthioxanthone, 2-chlorothioxanthone, 2-isopropylthioxanthone, diethylthioxanthone, benzyldimethylketal, benzylmethoxyethylacetal, benzoin methyl ether, benzoin butyl ether, anthraquinone, 2-tert-butylanthraquinone, 2-amylanthraquinone, β-chloroanthraquinone, anthrone, benzanthrone, dibenzsuberone, methyleneanthrone, 4-azidobenzylacetophenone, 2,6-bis(p-azidobenzilidene)cyclohexane, 2,6-bis(p-azidobenzilidene)-4-methylcyclohexanone, 2-phenyl-1,2-butadione-2-(o-methoxycarbonyl)oxime, 1-phenylpropanedione-2-(o-ethoxycarbonyl)oxime, 1,3-diphenylpropanetrione-2-(o-ethoxycarbonyl)oxime, 1-phenyl-3-ethoxy-propanetrione-2-(o-benzoyl)oxime, Michler's ketones, 2-methyl-1-[4-(methylthio)phenyl]-2-morpholino-propane-1-one, 2-benzyl-2-dimethylamino-1-(4-morpholinophenyl)-butanone, naphthalenesulfonyl chloride, quinolinesulfonyl chloride, n-phenylthioacrylidone, 4,4-azobisisobutyronitrile, diphenyldisulfide, benzthiazoldisulfide, triphenylphosphine, camphorquinone, N1717 manufactured by Asahi Denka Co., Ltd., carbon tetrabromide, tribromophenylsulfone, benzoin peroxide, eosin, and a combination of a photoreducing dye such as methylene blue with a reducing agent such as ascorbic acid or triethanolamine. In the invention, these photopolymerization initiators may be used alone or in combination of two or more thereof.

When the photopolymerization initiator is used, a photopolymerization initiation auxiliary can be used together. Examples of the photopolymerization initiation auxiliary include tertiary amines such as triethanolamine, methyldiethanolamine; and benzoic acid derivatives such as 2-dimethylaminoethylbenzoic acid and ethyl 4-dimethylamidobenzoate. However, the auxiliary is not limited thereto.

Examples of the above-mentioned polymerization inhibitor include reactive polymerization inhibitors such as diphenylpicrylhydrazide, tri-p-nitrophenylmethyl, p-benzoquinone, p-tert-butylcatechol, picric acid, copper chloride, methylhydroquinone, methoquinone, and tert-butylhydroquinone. Of these agents, hydroquinone based polymerization inhibitors are preferred from the viewpoint of the storage stability thereof. The use of methylhydroquinone is particularly preferred.

Compounds described below may be added to the optical anisotropic body in the invention as long as the objects of the invention are not damaged. Examples of the added compounds include a polyester (meth)acrylate obtained by causing (meth)acrylic acid to react with a polyester prepolymer obtained by condensing a polyvalent alcohol and a monobasic acid or polybasic acid; a polyurethane (meth)acrylate obtained by causing compounds having a polyol group and two isocyanate groups to react with each other, and then causing (meth)acrylic acid to react with the reaction product; photopolymerizable compounds such as an epoxy (meth)acrylate obtained by causing (meth)acrylic acid to react with an epoxy resin such as bisphenol A type epoxy resin, bisphenol F type epoxy resin, novolak type epoxy resin, polycarboxylic acid polyglycidyl ester, polyol polyglycidyl ether, aliphatic or alicyclic epoxy resin, amino group epoxy resin, triphenolmethane type epoxy resin, or dihydroxybenzene type epoxy resin; and photopolymerizable liquid crystalline compounds each having an acryl group or methacryl group.

The alignment state of the liquid crystalline monomer in the optical anisotropic body in the invention is not particularly limited as long as the alignment state is an alignment state making it possible that the optical element of the invention expresses desired optical characteristics. Examples of the alignment state include a state that the liquid crystalline monomer is aligned in parallel to the substrate, and a state that the liquid crystalline monomer is aligned perpendicularly to the substrate. The former liquid crystal structure is called homogeneous structure (parallel alignment structure). When the liquid crystalline monomer has this structure, a nature as an A plate can be optically given to the optical element of the invention. The latter structure is called homeotropic structure (vertical alignment structure). When the liquid crystalline monomer has this structure, a nature as a positive C plate can be optically given to the optical element of the invention.

The alignment state of the liquid crystalline monomer may be a cholesteric alignment state that the liquid crystalline monomer exhibits a regular helical structure. When the liquid crystalline monomer has this alignment state, a nature as a negative C plate can be optically given to the optical element of the invention.

When the alignment state of the liquid crystalline monomer is rendered a cholesteric alignment state, a chiral agent for inducing a helical structure to the optical anisotropic body is usually added thereto. As the chiral agent, a low molecular weight compound having in the molecule thereof axial asymmetry is preferably used. The chiral agent used in the invention is, for example, a compound represented by the following formula (17), (18) or (19):

[Chemical formula 4]

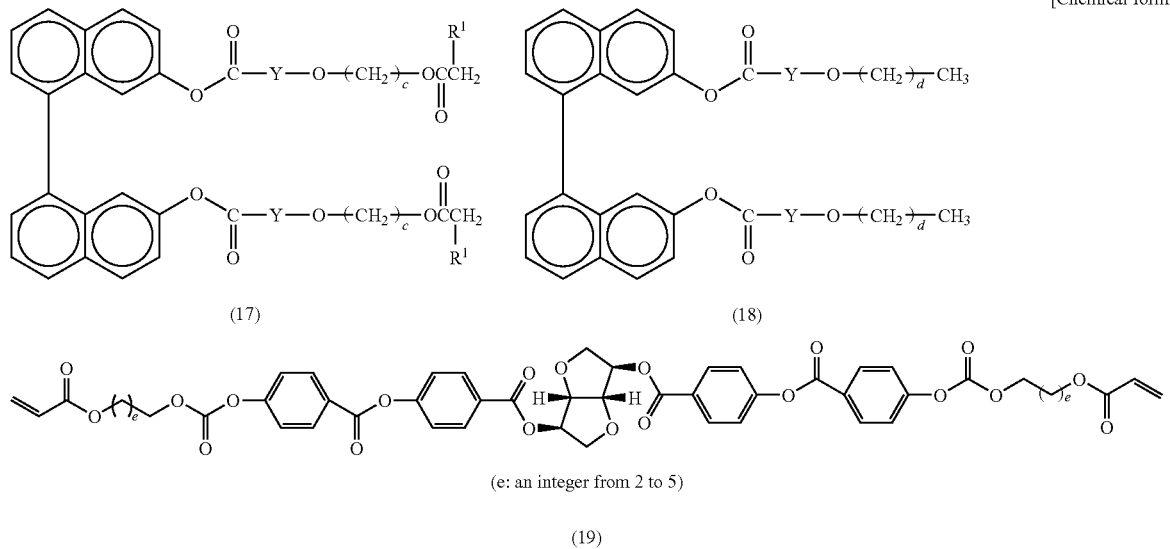

(e: an integer from 2 to 5)

(19)

[Chemical formula 5]

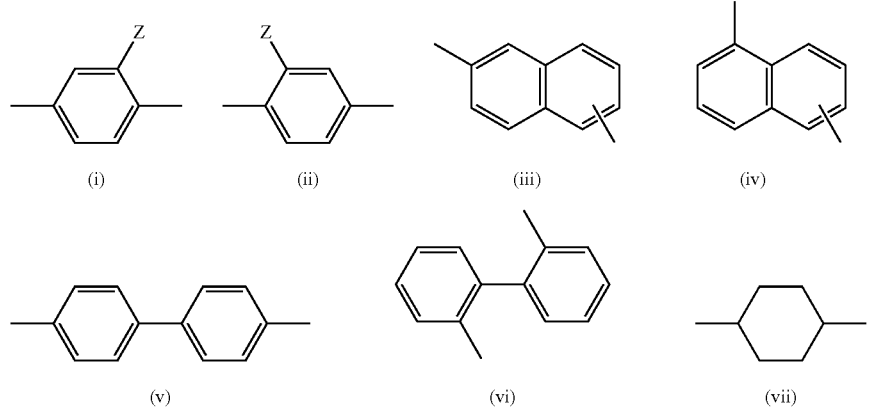

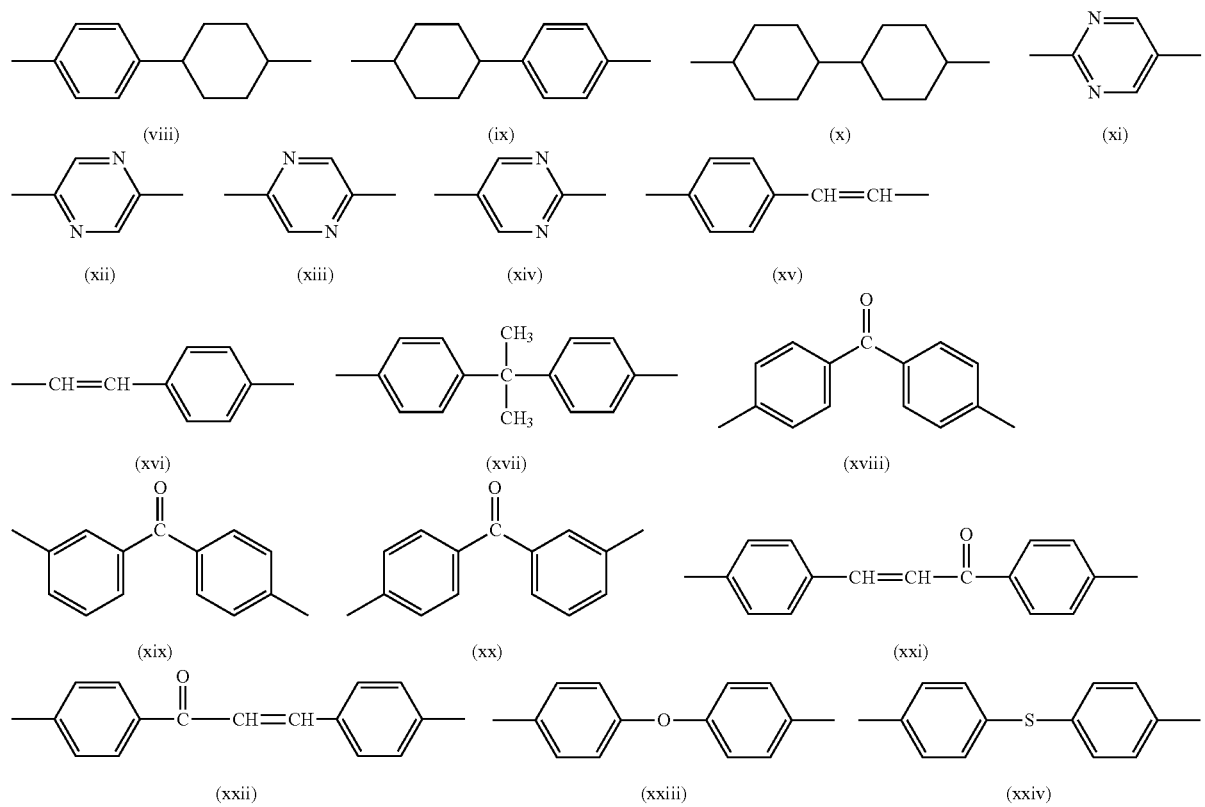

In the formula (17) or (18), $R^1$ represents hydrogen or a methyl group. Y is any one of formulae (i) to (xxiv) illustrated above. Out of the formulae, any one of the formulae (i), (ii), (iii), (v) and (vii) is preferred. Furthermore, c and d, which each represent the chain length of the alkylene chain, may be each independently any integer number in the range of 2 to 12, and is preferably in the range of 4 to 10, more preferably in the range of 6 to 9.

The thickness of the optical anisotropic body in the invention is not particularly limited as long as desired optical characteristics can be given to the optical element of the invention in accordance with the kind of the liquid crystalline monomer and other factors. The thickness is preferably from 0.5 μm to 10 μm, more preferably from 0.5 μm to 5 μm, in particular preferably from 1 μm to 3 μm.

5. Optical Element

The optical element of the invention may contain any other structure than the substrate, the stress releasing layer, the alignment layer and the optical anisotropic body. An example of the other structure is a barrier layer.

The barrier layer is usually formed between the substrate and the stress releasing layer in the optical element of the invention, and has barrier properties of preventing the plasticizer and any other low molecular weight compound from shifting from the substrate to the alignment layer and the optical anisotropic body.

The material which constitutes the barrier layer used in the invention is not particularly limited as long as the material can express the barrier properties. The material can be appropriately selected for use, considering the adhesion properties to the alignment layer, and others. Examples of the material used in the barrier layer in the invention include an ultraviolet ray curing type acrylurethane resin, an ultraviolet ray curing type polyester acrylate resin, an ultraviolet ray curing type epoxy acrylate resin, an ultraviolet ray curing type polyol acrylate resin, and an ultraviolet ray curing type epoxy resin.

The ultraviolet ray curing type acrylurethane resin is, for example, a product obtained by causing a product, which is obtained by causing a polyester polyol to react with an isocyanate monomer or prepolymer, to react with an acrylate type monomer having a hydroxyl group, such as 2-hydroxyethyl acrylate, 2-hydroxyethyl methacrylate (hereinafter, the word "acrylate" represents methacrylate as well as acrylate, and thus the two are represented by only the word "acrylate"), or 2-hydroxypropyl acrylate.

The ultraviolet ray curing type polyester acrylate resin is, for example, a product obtained by causing a polyol (such as a polyester polyol) to react with 2-hydroxyethyl acrylate or a 2-hydroxy acrylate type monomer.

The ultraviolet ray curing type epoxy acrylate resin is, for example, a product obtained by adding a reactive diluent and a photoreaction initiator to an epoxy acrylate as an oligomer, and causing the components to react with each other. As the photoreaction initiator, one or more can be selected for use from benzoin derivatives, oxime ketone derivatives, benzophenone derivatives, thioxanthone derivatives, and others.

The ultraviolet ray curing type polyol acrylate resin is, for example, trimethylolpropane triacrylate, ditrimethylolpropane tetraacrylate, pentaerythritol triacrylate, pentaerythritol tetraacrylate, dipentaerythritol hexaacrylate, alkyl-modified dipentaerythritol pentaacrylate, bis(acryloxyethyl)isocyanurate, and tri(acryloxyethyl)isocyanurate. Usually, these resins are each used together with a known photosensitizer.

In the invention, any one of the above-mentioned resins can be preferably used. The barrier layer may be made of any one of the resins, or may be made of a mixture of two or more of the resins.

The barrier layer used in the invention may contain a material other than the above-mentioned materials. Examples of the other material include a polymerization initiator, a silane coupling agent, and a filler.

The thickness of the barrier layer used in the invention is not particularly limited as long as the thickness makes it possible to express desired barrier properties in accordance with the material which constitutes the barrier layer, and others. The thickness preferably ranges from 1 μm to 10 μm.

The barrier layer used in the invention may be formed as a single layer which functions as the stress releasing layer also.

The optical element of the invention is preferably a retardation film, which has retardation properties. More specifically, about the optical element of the invention, the in-plane retardation (Re) preferably ranges from 50 nm to 300 nm at a wavelength of 550 nm. The thickness-direction retardation (Rth) preferably ranges from 0 nm to 300 nm at a wavelength of 550 nm. When the optical element of the invention is a retardation film having such retardation properties, the optical element of the invention can be rendered an element preferred as an optical compensation plate or a retardation plate for the liquid crystal display apparatus.

The in-plane retardation is a value represented by the following expression: $Re=(Nx-Ny) \times d$, in which the refractive index in the direction of a leading phase axis (the direction along which the refractive index is minimum) in the plane of the optical element is represented by Nx, the refractive index in the direction of a lagging phase axis (in the direction along which the refractive index is maximum) therein is represented by Ny, and the thickness of the optical element is represented by d. The thickness-direction retardation (Rth) is a value represented by the following expression: $Rth=\{(Nx+Ny)\}/2-Nz\} \times d$, in which the refractive index in the direction of the leading phase axis (the direction along which the refractive index is minimum) in the plane of the optical element is represented by Nx, the refractive index in the direction of the lagging phase axis (in the direction along which the refractive index is maximum) therein is represented by Ny, the refractive index in the thickness direction is represented by Nz, and the thickness of the optical element is represented by d. The in-plane retardation and the thickness-direction retardation can each be measured with an automatic birefringence measuring device (trade name: KOBRA-21ADH, manufactured by Oji Scientific Instruments).

The form of the optical element of the invention may be the form of a sheet having a predetermined size, or the form of a long object having a predetermined length. In the invention, the optical element is preferably in the form of a long object.

6. Optical Element Producing Process

Next, an example of the process for producing the optical element of the invention is described. The optical element of the invention can be produced through: a stress releasing layer forming step of coating a stress releasing layer forming composition onto a substrate, thereby forming a stress releasing layer onto the substrate;

an alignment layer forming step of coating an alignment layer forming composition onto the stress releasing layer formed in the stress releasing layer forming step, thereby forming an alignment layer onto the stress releasing layer; and an optical anisotropic body forming step of coating an optical anisotropic body forming composition onto the alignment layer formed in the alignment layer forming step, thereby forming an optical anisotropic body onto the alignment layer.

(1) Stress Releasing Layer Forming Step

The stress releasing layer forming step is described. The step is a step of coating a stress releasing layer forming composition onto a substrate, thereby forming a stress releasing layer onto the substrate.

The substrate used in the step is the same as described in the item "3. Substrate". Thus, the description thereof is omitted herein.

The stress releasing layer forming composition used in the present step may be a composition comprising a resin material which will constitute the stress releasing layer, and a solvent in which the material is dissolved. The resin material is the same as described in the item "1. Stress releasing layer". Thus, the description thereof is omitted herein.

The solvent used in the stress releasing layer forming composition is not particularly limited as long as the solvent is a solvent in which a photo alignment material and a monomer or oligomer can be dissolved into a desired concentration. It is particularly preferred to use a solvent having permeability into the substrate. The permeability is the same as described in the item "1. Stress releasing layer". Thus, the description thereof is omitted herein.

Examples of the solvent used in the present step include: hydrocarbon solvents such as benzene and hexane; ketone solvents such as methyl ethyl ketone, methyl isobutyl ketone and cyclohexanone; ether solvents such as tetrahydrofuran and 1,2-dimethoxyethane; halogenated alkyl solvents such as chloroform and dichloromethane; ester solvents such as methyl acetate, ethyl acetate, butyl acetate and propylene glycol monomethyl ether acetate; amide solvents such as N,N-dimethylformamide; sulfoxide solvents such as dimethylsulfoxide; anone solvents such as cyclohexane; and alcohol solvents such as methanol, ethanol and propanol. However, the solvent is not limited thereto. About the solvent used in the invention, one species thereof may be used, or two more species thereof may be used in a mixture form.

The method for coating the stress releasing layer forming composition onto the substrate is not particularly limited as long as the method is a method capable of attaining desired flat surface properties. Specific examples thereof include gravure coating, reverse coating, knife coating, dip coating, spray coating, air knife coating, spin coating, roll coating, printing, dipping and pulling-up, curtain coating, die coating, casting, bar coating, extrusion coating, and E type coating methods. However, the coating method is not limited thereto.

The thickness of the coated film of the stress releasing layer forming composition is not particularly limited, as long as desired flat surface properties can be attained. Usually, the thickness is preferably from 0.1 μm to 50 μm, more preferably from 0.5 μm to 30 μm, in particular preferably from 0.5 μm to 10 μm.

The method for drying the coated film of the stress releasing layer forming composition may be an ordinarily used drying method, such as a heat drying method, a reduced pressure drying method, or a gap drying method. The drying method in the invention is not limited to any single method, and may be, for example, a method with plural drying manners adopted correspondingly to, such as an embodiment in which the method for the drying is successively changed in accordance with the remaining solvent amount.

The method for drying the coated film of the stress releasing layer forming composition may be a method of blowing dry wind the temperature of which is adjusted to a predetermined temperature onto the coated film. In the case of using the drying method, the wind speed blown onto the coated film is preferably 3 m/second or less, in particular preferably 30 m/minute or less.

The thus formed coated film of the stress releasing layer forming composition is turned into a stress releasing layer by polymerizing the resin material in the coated film. The method for polymerizing the resin material may be decided in accordance with the kind of the resin material. In the invention, a method of radiating ultraviolet rays or visible rays to the resin material to polymerize the resin material is particularly preferred. When the ultraviolet rays or visible rays are radiated, it is preferred to radiate the rays at a relatively low illuminance.

As the radiated light, light with the wavelength range from 150 nm to 500 nm, more preferably from 250 nm to 450 nm, even more preferably from 300 nm to 400 nm is used. A light source for the radiated light may be a low-pressure mercury lamp (a germicidal lamp, a fluorescence chemical lamp, or a black light), a high-pressure discharge lamp (a high-pressure mercury lamp, or a metal halide lamp), a short arc discharge lamp (a superhigh mercury lamp, a xenon lamp, or a mercury xenon lamp), or the like.

(2) Alignment Layer Forming Step

The above-mentioned alignment layer forming step is described. The step is a step of coating an alignment layer forming composition onto the stress releasing layer formed in the stress releasing layer forming step, thereby forming an alignment layer onto the stress releasing layer.

The alignment layer forming composition used in the step is a composition comprising a photo alignment material, a monomer or oligomer having one or more functional groups, and a solvent in which these are dissolved.

The photo alignment material, and the monomer or oligomer having one or more functional groups are the same as described in the item "2. Alignment layer". Thus, the description thereof is omitted herein.

The solvent used in the alignment layer forming composition is not particularly limited as long as the solvent is a solvent in which the photo alignment material and the monomer or oligomer can be dissolved into a desired concentration. The solvent is the same as described in the item "(1) Stress releasing layer forming step". Thus, the description thereof is omitted herein.

In the present step, the method for forming the alignment layer forming composition onto the stress releasing layer is the same as described in the item "(1) Stress releasing layer forming step". Thus, the description thereof is omitted herein.

The formed coated film of the alignment layer forming composition can be turned into an alignment layer by curing the monomer or oligomer while cutting the absorption wavelength of the alignment layer composition, and then radiating the ultraviolet ray having an arbitrary polarized state thereto so as to cause the resultant to express alignment regulating force.

(3) Optical Anisotropic Body Forming Step

The optical anisotropic body forming step is described. The step is a step of coating an optical anisotropic body forming composition onto the alignment layer formed in the alignment layer forming step, thereby forming an optical anisotropic body onto the alignment layer.

The optical anisotropic body forming composition is a composition comprising a liquid crystalline monomer and a solvent in which the monomer is dissolved. The liquid crystalline monomer used in the optical anisotropic body forming composition is the same as described in the item "4. Optical anisotropic body". Thus, the description thereof is omitted herein.

The solvent used in the optical anisotropic body forming composition is not particularly limited as long as the solvent is a solvent in which the above-mentioned liquid crystal material can be dissolved into a desired concentration. Specific examples of the solvent are the same as described in the item "(1) Stress releasing layer forming step". Thus, the description thereof is omitted herein.

In the step, the method for forming the coated film of the optical anisotropic body forming composition onto the alignment layer is the same method as described in the item "(2) Alignment layer forming step". Thus, the description thereof is omitted herein.

In the step, the coated film of the optical anisotropic body forming composition is formed onto the alignment layer, and subsequently the liquid crystal monomer contained in the coated film is aligned; the method for aligning the liquid crystal monomer in the step is usually a method of heating the coated film to not lower than the temperature at which the liquid crystal monomer forms a liquid crystal layer.

Next, the method for polymerizing the liquid crystalline monomer may be decided at will in accordance with the kind of the polymerizable functional group that the liquid crystalline monomer has. In the invention, the method of radiating an active radial ray to the monomer to cure the monomer is particularly preferred. The active radial ray is not particularly limited as long as the radial ray makes it possible to polymerize the liquid crystalline monomer. Usually, it is preferred to use ultraviolet rays or visible rays from the viewpoint of the simplicity of the device therefor, and others. It is particularly preferred to use radiation light the wavelength of which is from 150 nm to 500 nm, preferably from 250 nm to 450 nm, more preferably from 300 nm to 400 nm.

7. Usage of the Optical Element

The optical element of the invention can be used as a retardation film, a viewing angle compensating film, a circular polarized film, a brightness enhancement film, or some other member that is integrated into a display apparatus or the like. In particular, the optical element of the invention can be preferably used as an optically compensating plate for improving the viewing angle dependency of a liquid crystal display apparatus.

B. Liquid Crystal Display Apparatus

Next, the liquid crystal display apparatus of the invention is described. The liquid crystal display apparatus of the invention is a display apparatus in which the optical element of the invention is used.

The liquid crystal display apparatus of the invention has an advantage that the number of display quality defects caused by damage of its alignment layer is small since the optical element of the invention is used.

In the invention, the embodiment that the optical element of the invention is used may be appropriately decided in accordance with the optical properties which the optical element of the invention has, and other factors. It is particularly preferred to arrange the optical element between its liquid crystal cell and its polarizing plate, and use the optical element.

Figure 4:
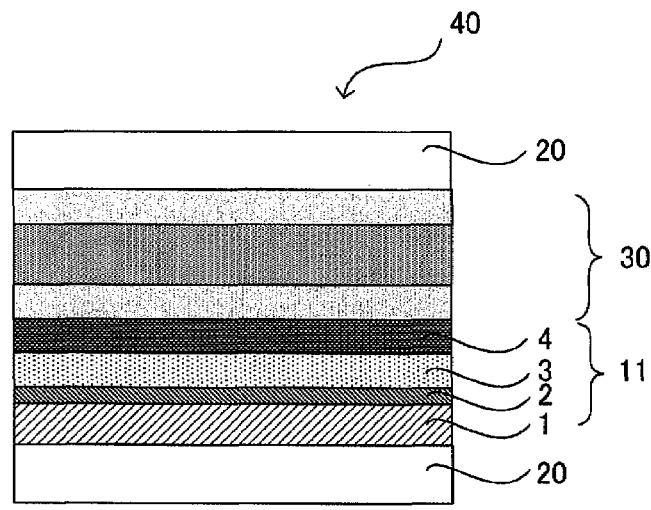
FIG. 4 is a schematic sectional view illustrating an example of a liquid crystal display element used in a liquid crystal display apparatus of the invention.
Figure 5:
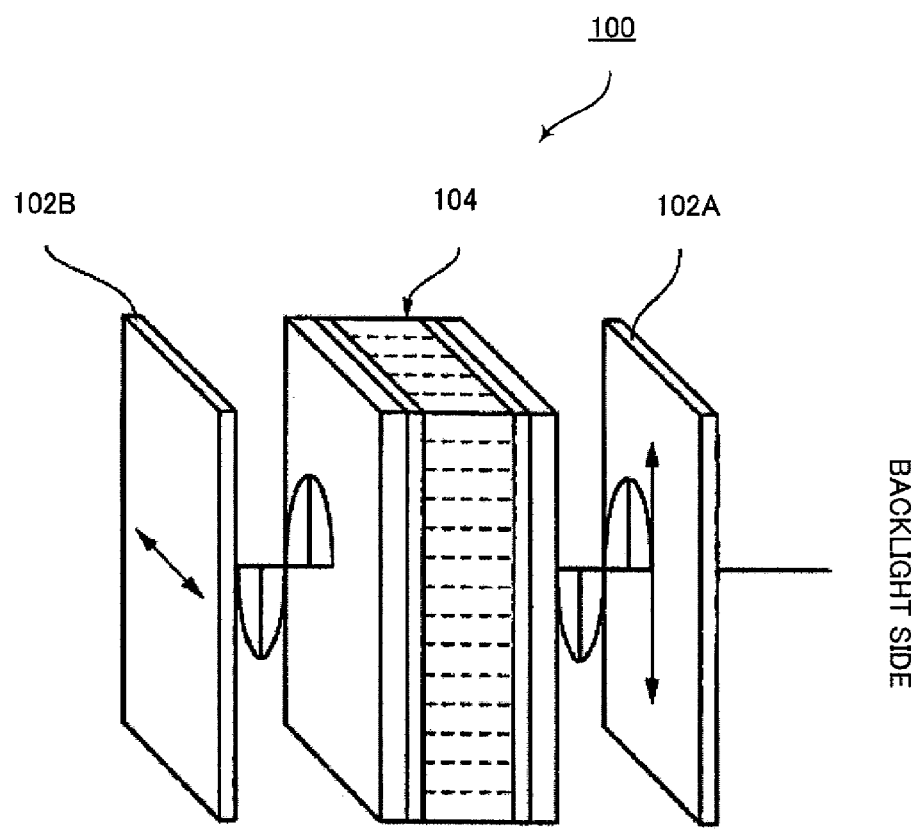
FIG. 5 is a schematic view illustrating an example of an ordinary liquid crystal display apparatus.

With reference to one of the attached drawings, a preferred embodiment of the liquid crystal display apparatus of the invention is described. FIG. 4 is a schematic sectional view illustrating an example of a liquid crystal display element which constitutes a part of the liquid crystal display apparatus of the invention. As illustrated in FIG. 4, in the liquid crystal display apparatus of the invention, it is preferred to use a liquid crystal display element 40 having a structure with a liquid crystal cell 30 sandwiched between two polarizing plates 20 and a structure with an optical element 11 of the invention arranged between at least one of the polarizing plates 20 and the liquid crystal cell 30.

The optical element of the invention which is used in the invention is the same as described in the item "A. Optical element". Thus, the description thereof is omitted herein.

In the liquid crystal display of the invention, constituents used in ordinary liquid crystal display apparatuses can be used as they are, except that the optical element of the invention is used. As the process for producing the liquid crystal display apparatus of the invention, a conventional process for producing a liquid crystal display apparatus can be adopted.

The invention is not limited to the above-mentioned embodiment. The embodiment is an example, and any embodiment which has substantially the same as the technical conception recited in the claims of the invention and produces the same effects and advantageous is included in the technical scope of the invention.

EXAMPLES

Next, the invention is more specifically described by way of the following examples.

In the following working examples and comparative examples, any universal hardness can be obtained by pushing a diamond intender having a facial angle of 136° into a stress releasing layer in a summation range of 300 mN in a measuring device "FISCHERSCOPE® H110" manufactured by Fischer Technology. Inc., and then measuring the pushed-in depth displacement.

Example 1

A liquid in which a material having, in its structure, polyethylene glycol diacrylate was dissolved in methyl ethyl ketone (MEK) to give a solid content of 40% was coated onto a substrate (triacetylcellulose (TAC)) with a bar coater, and then ultraviolet rays were radiated onto the resultant at 120 mJ, so as to cure the coated liquid, thereby forming a stress releasing layer. Onto the layer was coated an alignment layer forming composition, prepared by dissolving methyl ethyl ketone into an alignment layer solution containing a polymer having a cinnamoyl group, with a bar coater, so as to form an alignment layer. Furthermore, an optical anisotropic body solution containing a polymerizable nematic liquid crystal compound monomer was dissolved into toluene, and further a polymerization initiator was added thereto, so as to produce an optical anisotropic body forming composition. This composition was coated onto the alignment layer to form an optical anisotropic body.

When the alignment layer was formed, a bar coater (count: No. 0) was brought into contact with the coated face to damage the face intentionally. At this time, the state of the alignment of the liquid crystal was observed with the naked eye.

When the sample was sandwiched between crossed nicol polarizing plates and was observed, damages caused by the bar were hardly observed. The universal hardness of the cured stress releasing layer was 588 N/mm$^2$.

Example 2

An optical element was produced in the same way as in Example 1 except that a mixture, in which pentaerythritol triacrylate and polycaprolactone-modified urethane acrylate were mixed at a ratio of 1/1, was used as the material for forming the stress releasing layer.

In the same way as in Example 1, when the photo alignment layer was formed, a bar coater (count: No. 0) was brought into contact with the coated face to damage the face intentionally. At this time, the state of the alignment of the liquid crystal was observed with the naked eye. In the same way as in Example 1, when the sample was sandwiched between crossed nicol polarizing plates and was observed, damages caused by the bar were hardly observed. The universal hardness of the cured stress releasing layer was 655 N/mm$^2$.

Example 3

An optical element was produced in the same way as in Example 1, except that polycaprolactone-modified urethane acrylate was used as the material for forming the stress releasing layer. In the same way as in Example 1, when the photo alignment layer was formed, a bar coater (count: No. 0) was brought into contact with the coated face to damage the face intentionally. At this time, the state of the alignment of the liquid crystal was observed with the naked eye. In the same way as in Example 1, when the sample was sandwiched between crossed nicol polarizing plates and was observed, damages caused by the bar were hardly observed. The universal hardness of the cured stress releasing layer was 482 N/mm$^2$.

Example 4

A caprolactone-modified acrylate was used as the material for forming the stress releasing layer, so as to coat the material onto a substrate in the same way as in Example 1. After the coating, dry wind having a wind speed (10 m/minute) equal to the speed of the substrate was blown onto the coated film to dry the film. Since the film was dried with the dry wind having the wind speed (10 m/minute), which was equal to the speed of the substrate, a stress releasing layer having no irregularities was formed. Thereafter, a gas chromatography was used to measure the residual solvent under dry conditions at a temperature of 150° C. for 10 minutes. The amount was 60 mg/m$^2$. In this way, a sample with blocking less caused was produced.

Example 5

Triacetylcellulose, urethane acrylate and methyl ethyl ketone were used as a substrate, a stress releasing layer forming material, and a solvent, respectively, to form a stress releasing layer. At this time, the film thickness was 7 μm. Furthermore, an alignment layer and an optical anisotropic body were formed in the same way as in Example 1. As a result, methyl ethyl ketone permeated into the substrate, and the adhesion between the substrate and the stress releasing layer was improved. Thus, in a lattice pattern tape-peeling test in accordance with JIS5400, adhesion properties of 100/100 was able to be obtained. On the basis of the film thickness of the stress releasing layer which was 7 μm, the plasticizer in the substrate was able to be blocked and further the stress releasing layer was able to block solvent-attack.

Example 6

Triacetylcellulose, an acrylate to which 4 mol of bisphenol FE was added, and toluene were used as a substrate, a stress releasing layer forming material, and a solvent, respectively. This way caused the stress releasing layer material to permeate into the substrate, and caused the adhesion between the substrate and the stress releasing layer to be improved. Thus, in a lattice pattern tape-peeling test in accordance with JIS5400, adhesion properties of 100/100 was able to be obtained.

Example 7

Hexanediol diacrylate was used as a stress releasing layer material to form a coated film in the same way as in Example 5, and then ultraviolet ray was radiated thereto at 300 mJ to cure the film, thereby forming a stress releasing layer. A microscopic infrared spectroscopic instrument was used to measure the average cure extent thereof. As a result, it was 95%. This way made it possible to wind the layer into a roll form without causing blocking.

Comparative Example

A material having, in its structure, dipentaerythritol hexaacrylate was dissolved into MEK to give a solid content of 40%. This liquid was coated onto a transparent support (TAC) with a bar coater. Ultraviolet ray was radiated onto the liquid at 120 mJ to cure the liquid. In the same way as in Example 1, a photo alignment layer and an optical anisotropic body were each formed on the cured coated film. When the photo alignment layer was formed, a bar coater (count: No. 0) was brought into contact with the coated face to damage the face intentionally. At this time, the state of the alignment of the liquid crystal was observed with the naked eye.

When the sample was sandwiched between crossed nicol polarizing plates and was observed, many damages caused by the bar were observed. The universal hardness of the cured stress releasing layer was 1000 N/mm$^2$.

The invention claimed is:

1. An optical element, comprising a single layer which has both of a function of a stress releasing layer and a function of a substrate, and an alignment layer over the single layer which has both of a function of a stress releasing layer and a function of a substrate, wherein the single layer which has both of a function of a stress releasing layer and a function of a substrate is not formed on a support substrate, but supports the alignment layer, wherein the single layer which has both of a function of a stress releasing layer and a function of a substrate comes into direct contact with the alignment layer as an underlying layer for the alignment layer, and wherein the single layer which has both of a function of a stress releasing layer and a function of a substrate has a hardness in the range of universal hardnesses from 200 N/mm$^2$ to 800 N/mm$^2$ when the layer has a thickness of 4 μm.

2. The optical element according to claim 1, wherein the single layer which has both of a function of a stress releasing layer and a function of a substrate has an elastic modulus in the range of 0.2 to 0.6, the elastic modulus being defined as a value of elastic deformation amount/total deformation amount.

3. The optical element according to claim 1, wherein an average cure extent of the single layer which has both of a function of a stress releasing layer and a function of a substrate is 60% or more.

4. The optical element according to claim 1, wherein content of a residual solvent remaining in the single layer which has both of a function of a stress releasing layer and a function of a substrate is in the range of 1 mg/m$^2$ to 250 mg/m$^2$.

5. The optical element according to claim 1, wherein a thickness of the single layer which has both of a function of a stress releasing layer and a function of a substrate is in the range of 0.5 μm to 100 μm.

6. The optical element according to claim 1, wherein an optical anisotropic body is formed over the alignment layer.

7. The optical element according to claim 6, wherein the optical anisotropic body includes a polymer made from a liquid crystalline monomer.

8. The optical element according to claim 6, wherein the optical element is a retardation film.

9. A liquid crystal display apparatus, wherein the optical element according to claim 1 is used.

* * * * *